(12) United States Patent
Uhl et al.

(10) Patent No.: US 7,327,514 B2
(45) Date of Patent: Feb. 5, 2008

(54) MICROSCOPE SYSTEM COMPRISING ACTUATOR ELEMENT FOR MOVING THE OBJECTIVE LENS FOR FOCUSSING

(75) Inventors: Rainer Uhl, Graefelfing (DE); Hartmann Harz, Munich (DE)

(73) Assignee: Till I.D. GmbH, Graefelfing (DE)

( * ) Notice: Subject to any disclaimer, the term of this patent is extended or adjusted under 35 U.S.C. 154(b) by 110 days.

(21) Appl. No.: 10/547,370

(22) PCT Filed: Mar. 1, 2004

(86) PCT No.: PCT/EP2004/002044
§ 371 (c)(1),
(2), (4) Date: Aug. 29, 2005

(87) PCT Pub. No.: WO2004/077123
PCT Pub. Date: Sep. 10, 2004

(65) Prior Publication Data
US 2006/0164721 A1 Jul. 27, 2006

(30) Foreign Application Priority Data
Feb. 28, 2003 (DE) ................ 103 09 138

(51) Int. Cl.
*G02B 21/32* (2006.01)
(52) U.S. Cl. ............... 359/381; 359/379; 359/383
(58) Field of Classification Search ......... 359/368, 359/379–384
See application file for complete search history.

(56) References Cited
U.S. PATENT DOCUMENTS

| | | | | |
|---|---|---|---|---|
| 3,648,587 A | * | 3/1972 | Stevens | 355/44 |
| 4,351,709 A | * | 9/1982 | Goetz | 204/549 |
| 4,770,520 A | * | 9/1988 | Hoogesteger | 359/513 |
| 5,870,223 A | * | 2/1999 | Tomimatsu | 359/392 |
| 6,396,532 B1 | * | 5/2002 | Hoover et al. | 348/79 |
| 6,636,352 B2 | | 10/2003 | Engelhardt | |
| 6,909,540 B2 | | 6/2005 | Engelhardt et al. | |
| 7,035,002 B2 | * | 4/2006 | Dietzsch et al. | 359/368 |

FOREIGN PATENT DOCUMENTS

JP 2001-356256 A 12/2001

OTHER PUBLICATIONS

Newsletter Physik Instrumente (PI) GMBH: Position Und Bewegung, No. 26, 1999, L XPOO2287814, p. 4.

* cited by examiner

*Primary Examiner*—Joshua L Pritchett
(74) *Attorney, Agent, or Firm*—David S. Safran (57) ABSTRACT

A microscope system having a plurality of exchangeable objective lenses (10); an objective lens changeover element (18) for supporting each of the objective lenses which is operable for placing a selected one of said objective lenses into an optical axis (22) of the microscope system, wherein each objective lens is supported by the changeover element in such a manner that each objective lens is moveable coaxially with respect to the optical axis and relative to the changeover element; and an actuator element (20, 40) for moving the selected one of the objective lenses coaxially relative to the optical axis and relative to the changeover element for focusing the selected one of the objective lenses relative to a specimen (12).

37 Claims, 7 Drawing Sheets

MICROSCOPE SYSTEM COMPRISING ACTUATOR ELEMENT FOR MOVING THE OBJECTIVE LENS FOR FOCUSSING

BACKGROUND OF THE INVENTION

1. Field of the Invention

The present invention relates to a microscope system, and more particularly, to a microscope system comprising an objective lens and an actuator element for moving the objective lens in order to focus the objective lens with respect to a specimen to be examined.

2. Description of Related Art

An optical microscope serves to view a sample by placing it in the central optical axis of an objective lens and by establishing a suitable distance between sample and objective lens, such that an image of the specimen can be formed by the microscope optics, consisting of an objective lens or an objective lens in conjunction with a suitable tube lens. Observation of the resulting image is accomplished either directly by a detector placed in the intermediary image plane or by the eye of the operator, in which case, usually an additional optical element (i.e., an ocular lens) is needed.

Both detector means yield two-dimensional image information, i.e., only one section of a three-dimensional object is "in focus." Given that microscope optics usually exhibit a high numerical aperture, this focused section is very narrow, and in order to construct a three-dimensional image one has to record a series of images at different focus positions. For this purpose, the object stage is moved relative to the objective lens, which is fixed in its z-position, or the objective lens is moved relative to the z-position fixed specimen. The latter type, called "fixed stage" microscopes, have the advantage that assemblies attached to the sample (e.g., micropipettes, perfusion devices, etc.) do not need to be moved simultaneously when the focus position is changed.

In order to allow for more than one magnification of the microscope, different objective lenses with different focal lengths are commonly employed. In prior art, they are mounted on a revolver, which allows the selected objective to be brought into the central optical axis of the microscope. This is done manually or in a motorized fashion. Fixed stage focusing then occurs by moving the whole objective revolver relative to the specimen. Manual research microscopes employ two drive mechanisms for this purpose, a coarse drive to bring the objective in position, and a fine drive for finding the precise focus position. In motorized versions, coarse and fine drive are usually united into one drive, and when an even finer positioning is required, piezo elements are placed between the objective revolver and individual objectives. However, such dedicated piezo drives extend the distance between the objective and the remaining microscope optics by 15-20 mm and exhibit several distinct disadvantages:

Piezo-drives are expensive. To drive n objectives, n piezo drives and n piezo drive electronics boards are required.

all objectives, which are not equipped with piezo drives, require spacers in order to have their focal plane at the same position.

The cables leading to each piezo drive are in the way when the objective revolver is turned in order to position another objective in the central optical axis of the system.

The distance between the objective and the residual optics of the microscope is affected by these spacers or the additional length of the piezo drives. While this has no detrimental impact in systems with infinity corrected optics, in which the position of the objective's back focal does not matter, it must be corrected for in systems like confocal or Total Internal Reflection Fluorescence (TIRF) arrangements.

The rotation axis of objective revolvers is usually inclined at an angle in order to allow the changing of an objective without having to withdraw it from its focused position. If the rotation axis were vertical, the objective being rotated out of the beam and the one being rotated into the beam would both touch the holder for the specimen during rotation. However, with motorized drives, which facilitate the re-finding of a previous position, one no longer needs to change objectives without withdrawing them. This allows the usage of schemes for holding objectives, moving them into the central optical axis of the microscope system and focusing them, which serve several other purposes at the same time as will be described below.

U.S. Patent Application Publication 2002/0001126 A1 discloses a microscope system comprising an inventory of a plurality of objective lenses, wherein one of the objective lenses is selected and is moved along a guide rail from a storage position to a reference position within the central optical axis of the microscope system. The reference position is defined by a retaining element. The guide rail is designed such that the objective lens moves—in the vicinity of the retaining element—substantially coaxially with the optical axis.

SUMMARY OF THE INVENTION

It is an object of the present invention to provide for a microscope system having a simple construction and allowing for an easy and convenient selection and focal adjustment of one objective lens from a plurality of objective lenses.

It is another object of the invention to provide for a microscope system wherein the objective lens can be focused by particularly simple and versatile construction.

It is a still further object of the invention to provide for a microscope system which is completely sealed with respect to an exterior space in which a specimen to be examined is located.

The above objects are achieved by the present invention, one aspect of which is a microscope system having a plurality of exchangeable objective lenses, an objective lens changeover element for supporting each of said objective lenses which is operable for placing selected one of the objective lenses into an optical axis of the microscope system, wherein each objective lens is supported by the changeover element in such a manner that each objective lens, when selected, is moveable independently from the other of the objective lenses coaxially relative to said optical axis and relative to the changeover element, and an actuator element for moving the selected one of the objective lenses coaxially relative to the optical axis and relative to the changeover element for focusing the selected one of the objective lenses relative to a specimen. This microscope system has a particularly simple construction for selecting and focusing one objective lens of a plurality of objective lenses.

Another aspect of the present invention is a microscope system having an objective lens, a support element forming an outer surface with an opening, the objective lens penetrating through the opening, the support element being designed for supporting the objective lens on an optical axis of said microscope system in such a manner that the objective lens is moveable within the opening coaxially relative to the optical axis and relative to said support element, and an actuator element for moving the objective lens coaxially relative to the optical axis and relative to the support element for focusing the objective lens relative to a specimen. This microscope system has a particularly simple and versatile construction for focusing an objective lens.

According to a preferred embodiment, the microscope system comprises means for sealing the opening of the support element in order to prevent liquid from passing through the opening. The support element preferably is adapted for liquid-tight sealing of an interior space of the microscope system relative to an exterior space outside of the microscope system. As a result, the support element, in addition to its support and guide function, also may serve as protection for the interior space of the microscope system.

Still another aspect of the present invention is a microscope system having an interior space, at least one objective lens located within the interior space; an actuator element for moving the objective lens coaxially relative to the optical axis for focusing the objective lens relative to a specimen, a transparent substrate for supporting the specimen on a side of the substrate facing an exterior space, a protection element for liquid-tight sealing of the interior space relative to said exterior space, the protection element comprising an opening which is covered by the substrate at that end which faces the exterior space and which is provided with a liquid-tight, transparent seal at that end of the opening facing the interior space.

By providing for a protection element with an opening sealed by the specimen substrate, the interior space including the objective lens(es) may be completely sealed relative to an exterior space including the specimen, i.e., against the environment of the specimen, without sacrificing optical properties. According to a preferred embodiment, the protection element may serve as a support for at least one mechanical component, such as an x-y stage or a micropipette, and may comprise at least one integrated electronic connector or at least one media supply channel, thereby serving as an interface between the microscope and the environment of the specimen, which is used to hold, move and/or manipulate the specimen.

In the following, preferred embodiments of the invention are explained in detail by way of examples using the accompanying drawings.

DETAILED DESCRIPTION OF THE INVENTION

Figure 1:
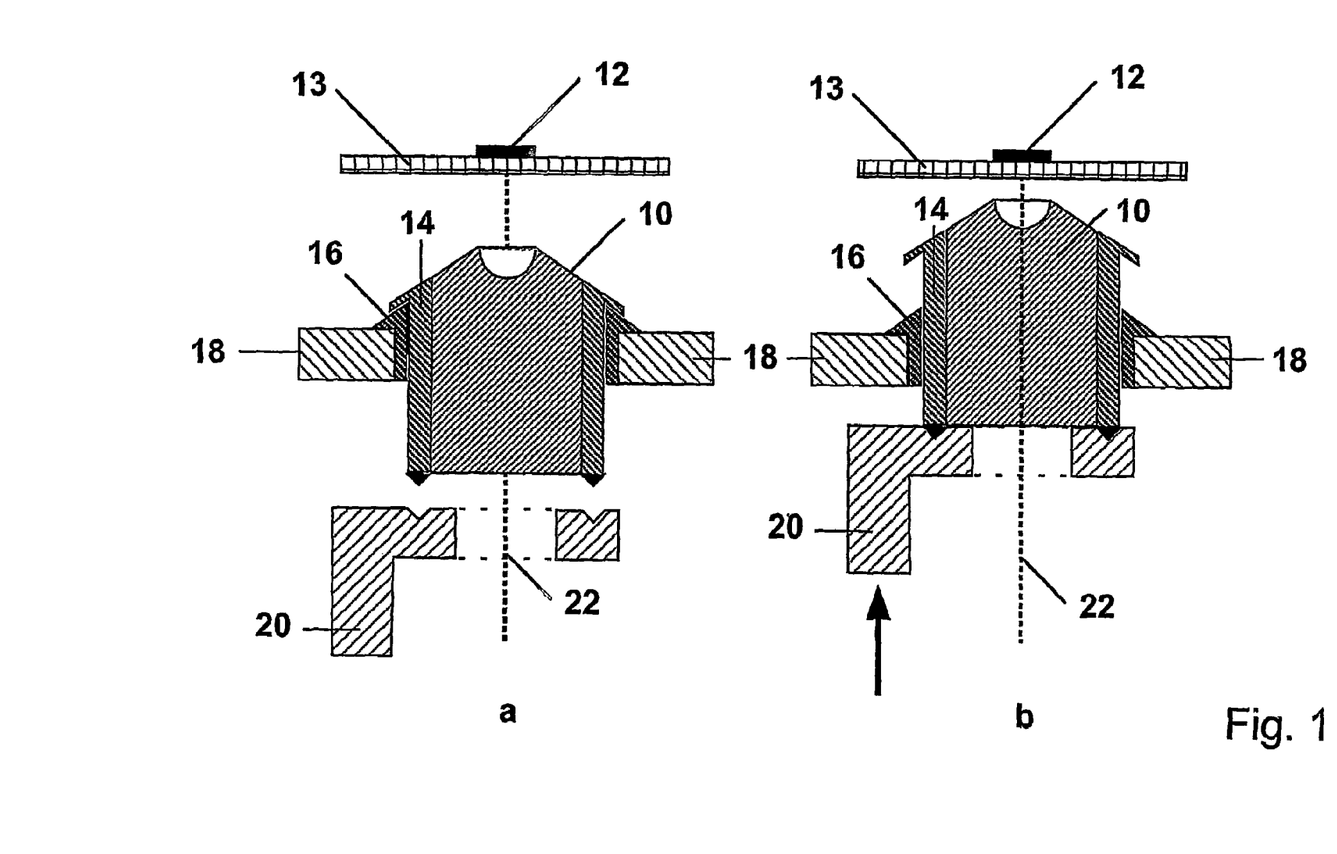
FIGS. 1a and 1b are schematic cross-sectional views of an embodiment of a microscope system comprising a single objective lens according to the invention in a resting position and a focused position, respectively.

FIGS. 1a and 1b schematically show an example of a microscope system according to the invention. The microscope system is an inverted microscope and comprises an objective lens 10, defining a central optical axis 22, a specimen 12 located above the objective lens 10 on a transparent substrate 13, usually made from glass, and a support element 18 forming an outer surface. A holding collar 14 is provided, which tightly fits around the objective 10. The holding collar 14 can slide within a matching resting ring 16, fitting inside an opening of the support element 18, until, in its lowermost position, it reaches a stable resting state. The objective lens 10 and the holding collar 14 penetrate through the opening formed in the resting ring 16. The resting ring 16 serves to support the objective lens 10 with the holding collar 14 for a movement coaxial to the central optical axis 22 and relative to the support element 18, thereby pre-centering the objective lens 10 within the opening of the support element 18. Preferably, such sliding engagement between the holding collar 14 and the resting ring 16 is provided by an air gap of, for example, 10 to 50 µm.

An actuator element formed by a vertical drive mechanism 20 is provided beneath the objective lens 10 for moving the objective lens 10 along the central optical axis 22 for focusing the objective lens 10 with respect to the specimen 12, i.e., for vertically adjusting the focal plane of the objective lens 10 with respect to the specimen 12. The drive mechanism 20 has a hole enabling penetration of light through the drive mechanism 20 to and from the objective lens 10 along the central optical axis 22.

In FIG. 1a, the drive mechanism 20 is fully withdrawn, i.e., it is in its lowest position, and thus, does not engage with the objective lens 10 or its holding collar 14. In this resting position, the objective lens 10 is suspended within the opening formed by the resting ring 16, with the holding collar 14 being supported by the resting ring 16.

In a working position shown in FIG. 1b, the drive mechanism 20 is engaged with the lower end of the objective lens 10 or its holding collar 14, allowing the objective 10 to move upwards along the central optical axis 22 into a focused position, whereby the drive mechanism 20 also serves to guide the objective lens 18 coaxially relative to the central optical axis 22. The engagement is detachable and is provided, for example, by magnetic means (not shown).

The holding collar 14 and the resting ring 16 are engaged in such a manner that they provide for a liquid-tight sealing in order to prevent liquids from an exterior space including the specimen 12, i.e., from the space above the support element 18, from passing through the opening formed by the resting ring 16 into an interior space of the microscope system, i.e., the space below the support element 18. To this end, the air gap between the holding collar 14 and the resting ring 16 is so narrow that the surface tension of the liquids in the exterior space prevents these liquids from passing through this gap.

The support element 18 has a plate-like design and serves as a protecting lid for providing—together with the liquid-tight sealing engagement of the holding collar 14 and the resting ring 16 for a protection against external liquids in the environment of the specimen 12 even at an extended (focused) position of the objective lens 10. The shape of the support element 18 is best chosen such that any fluid spilled takes a predefined route.

Figure 2:
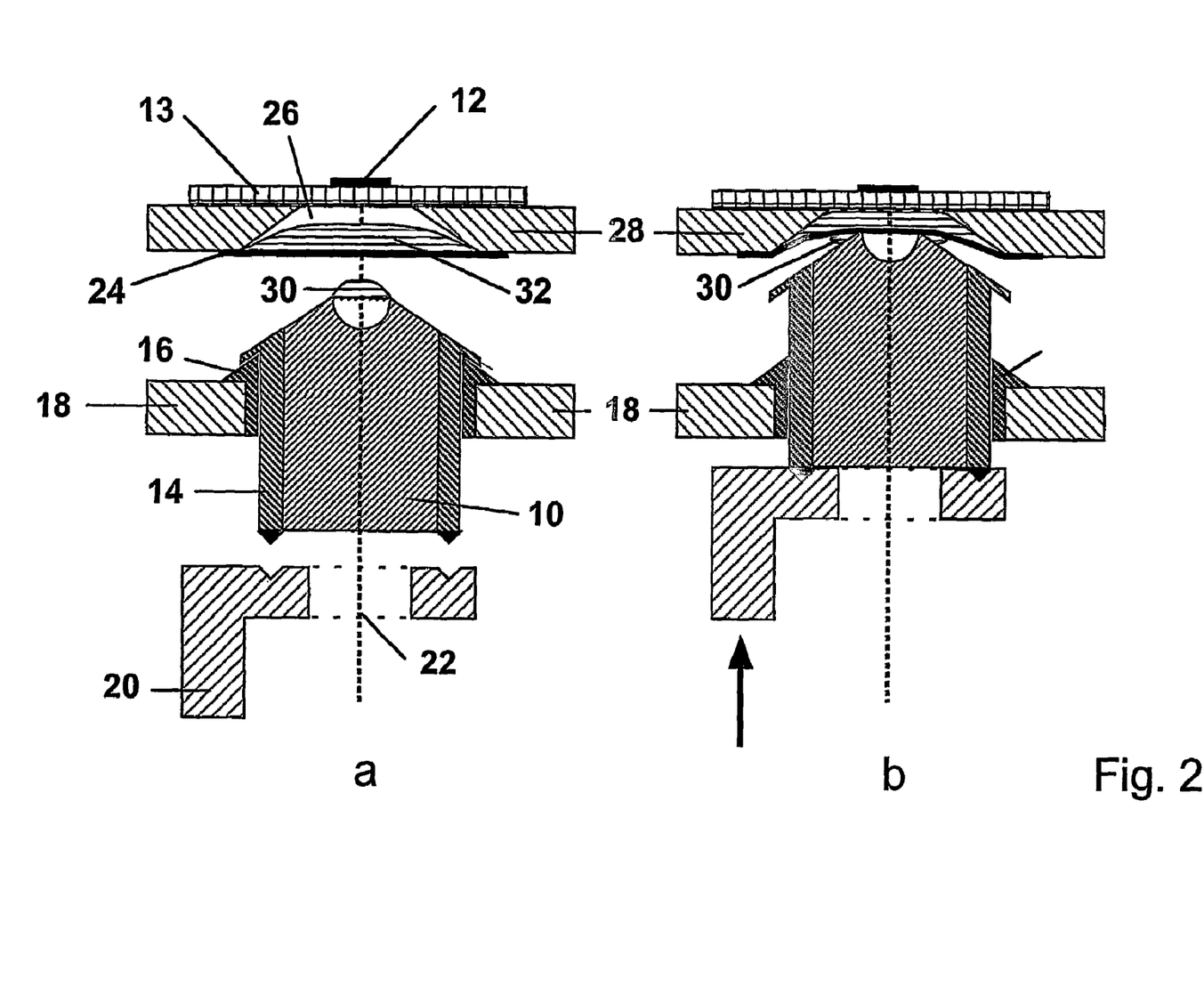
FIGS. 2a and 2b are views like FIGS. 1a and 1b, respectively, of a modified embodiment, with a double protection feature having been added.

FIGS. 2a and 2b show a double protection version of the embodiment shown in FIGS. 1a and 1b, which is particularly advantageous when the microscope system is to be used under sterile conditions. In addition to the embodiment shown in FIGS. 1a and 1b, a protection element 28 is provided above the objective lens 10. The protection element 28 provides a gas-tight and liquid-tight sealing of an interior space, including the entire microscope with the objective lens 10 and its support mechanism 20, relative to an exterior space, which includes the specimen 12 and its environment, i.e., the space above the protection element 28. The protection element 28 is formed as a protective lid. Its function is to separate the (possibly contaminated) region of the set-up with the specimen from the rest, which includes the microscope and all its mechanical, optical and electronic accessories.

The protection element has an opening 26, over whose inner (lower) end a thin, optically clear diaphragm 24 is stretched and fastened. The outer (upper) end of the opening 26 is covered by the substrate 13, which carries the specimen 12 on its outer (upper) side. Protection element 28 and diaphragm 24 together form a liquid-tight and gas-tight seal, separating the interior of the microscope from the environment of the specimen 12.

The diaphragm 24 is pressed against the objective 10 when the latter approaches the "focused position." By bringing a suitable immersion fluid 30 between objective lens 10 and diaphragm 24, the diaphragm 24 forms the outermost optical element of the objective 10. It may be advantageous to construct special objectives for this particular purpose. Above the diaphragm 24 an immersion fluid 32 may be kept in a reservoir formed by the opening 26 and the diaphragm 24 in case immersion objectives are to be used. The immersion fluid 32 in the reservoir may be replenished from another reservoir in the protecting element 28 (not shown). By bringing the objective 10 close to its focused position, the immersion fluid 32 automatically bridges the gap between the objective 10 (with its extension through the diaphragm 24 and the immersion fluid 30) and the specimen 12 on its support-substrate 13, as is required for the function of an immersion objective, see FIG. 2b.

Figure 3:
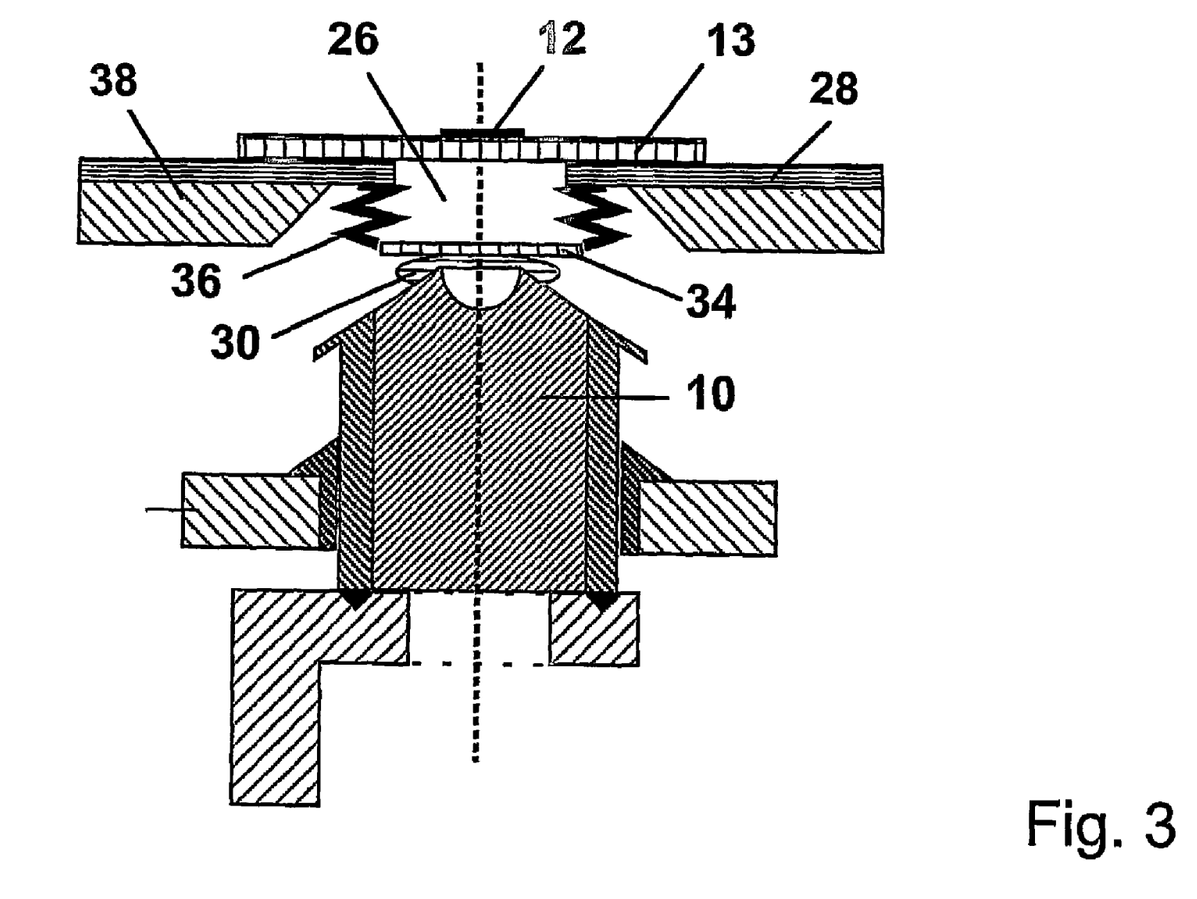
FIG. 3 is a view like FIG. 2b, of a modified embodiment comprising an elastic sleeve.

FIG. 3 shows a modified embodiment, wherein—in order to allow for optimally sterile conditions—the diaphragm 24 is replaced by a clear window 34, which is connected to the protection element 28 by an elastic collar 36. Both the clear window 34 and the elastic collar 36 may be part of a removable protection element 28, which is supported by a fixed body 38 of the microscope system. The protection element 28 has an opening 26 on top of which the substrate 13 with the specimen 12 is placed. The elastic collar 36 surrounds the opening 26 and projects into an aperture of the body 38, with the clear window 34 being provided at the inner (lower) end of the elastic collar 36. The removable protection element 28 may be formed by a disposable padding completely surrounding the exterior space with the specimen 12 and can be formed in the manner of a bellows as shown.

The elastic collar 36 is compressible in the vertical direction. When the objective lens 10 is moved along the central optical axis 22, the window 34 is pushed upwards, and thus, a moves in parallel with the objective lens 10 while this is moved through its focusing range, while at the same time a seal is maintained. When using immersion objectives, a suitable immersion fluid reservoir (not shown) has to be integrated into the removable protection element 28.

The material of the window 34 has to be chosen such that it does not deteriorate the optical performance of the microscope system, possibly requiring the usage of objective lenses especially constructed or modified for this task.

Figure 4:
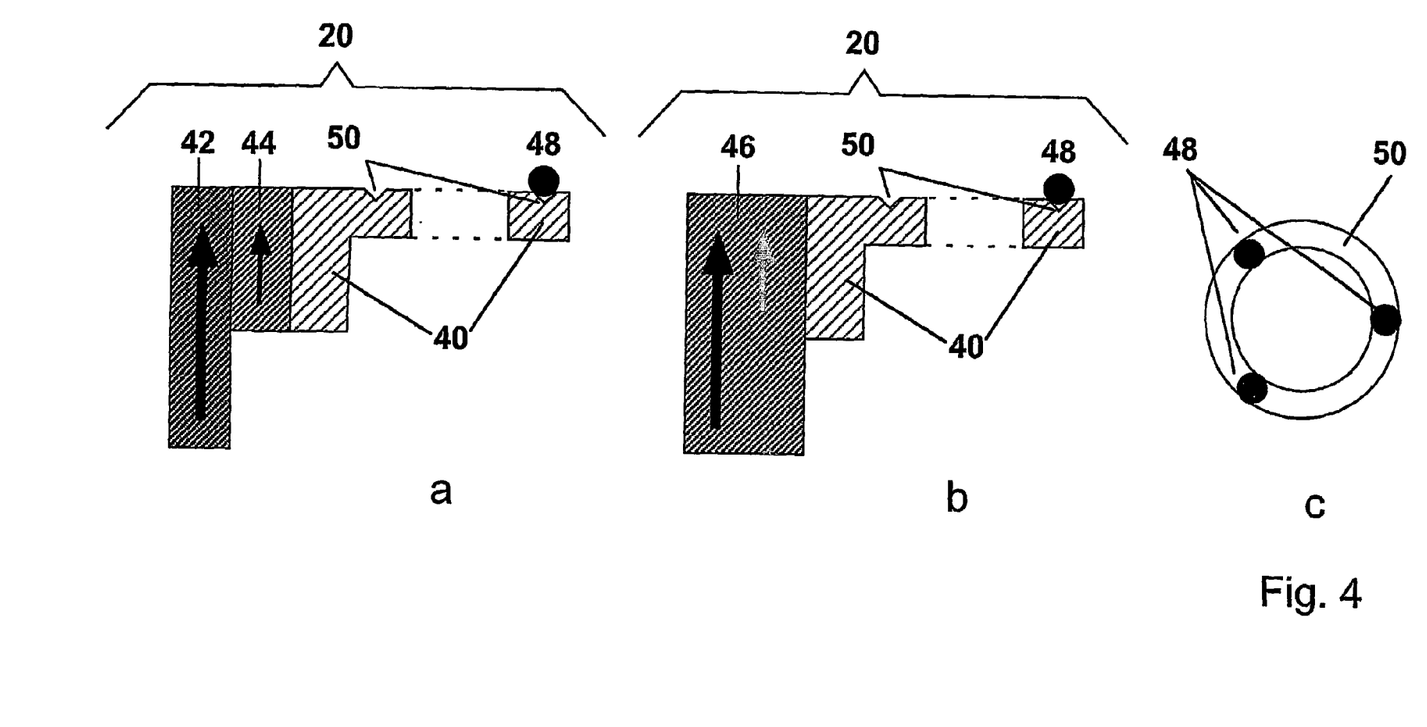
FIG. 4a is a cross-sectional side view of an actuator element having a coarse and a fine drive and an automated self-centering support for the engagement of drive and objective lens.
FIG. 4b is a cross-sectional side view of an actuator element having a combo drive and an automated self-centering support for the engagement of drive and objective lens.
FIG. 4c is a top plan view of the self-centering support of an actuator element.

As shown in FIGS. 4a-4c, the vertical drive mechanism 20 may comprise a support arm 40, which is moved either by a combination of a coarse drive 42 and a fine drive 44, working in series, or by a combo-drive mechanism 46, which combines very high resolution with extended travel. The coarse drive 42 may be of a motor-driven spindle type, whereas the fine drive 44 may be a piezo stack with proper magnification. Combo-drives 46 may comprise alternative piezo motor means, but any other suitable drive mechanism may be employed here. Engagement of the support arm 40 with the lower end of the objective lens 10 to be focused may be facilitated by appropriate centering means, e.g., by fitting three spheres 48 fastened at the lower end of the objective lens 10 into a v-groove 50 centered around the central optical axis 22, which is provided at the support arm 40. To improve the engagement process, suitable magnets may be employed (not shown).

Figure 5:
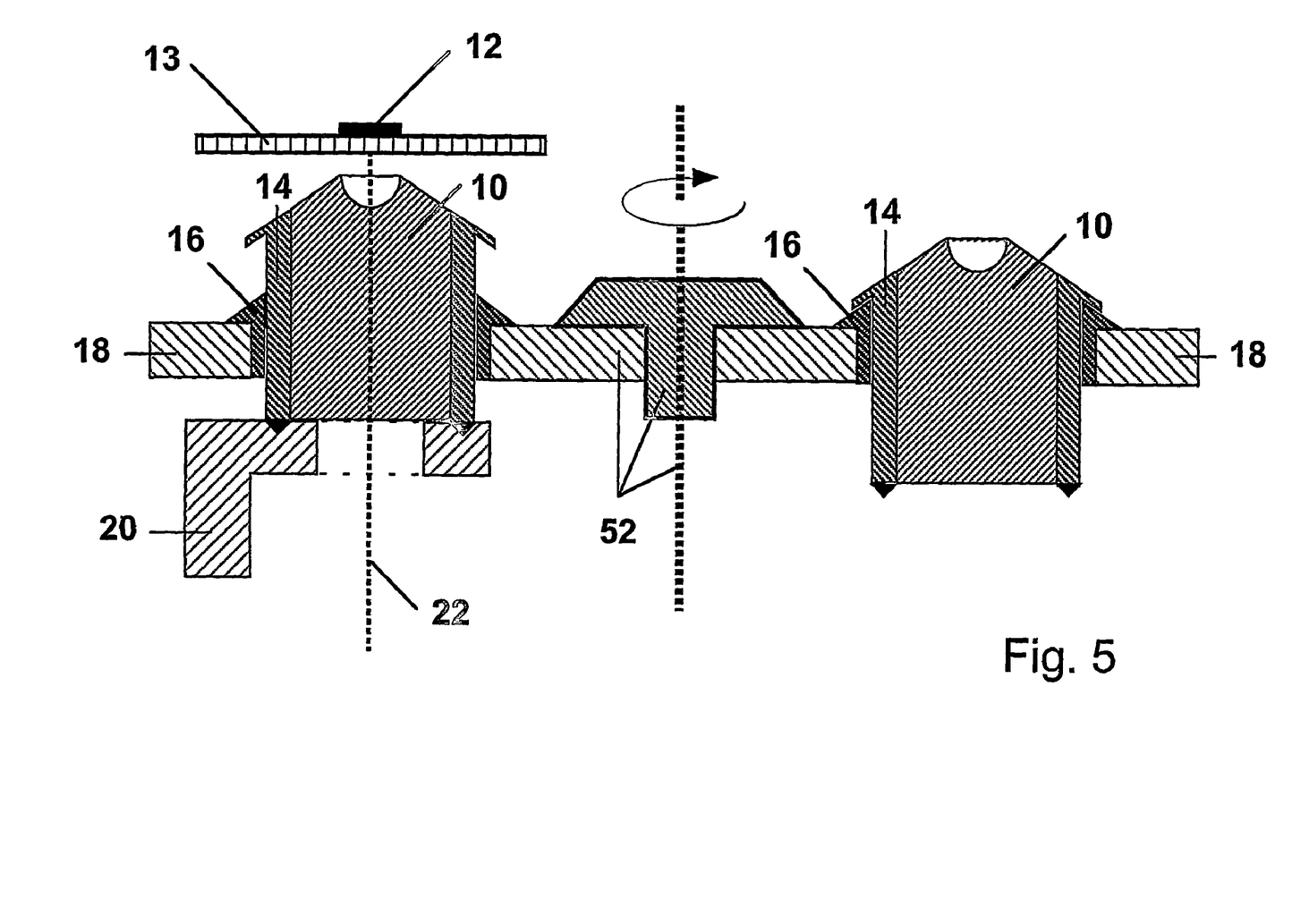
FIG. 5 is a schematic cross-sectional view of an embodiment of a microscope system according to the invention comprising a changeover carousel for selecting and focusing one objective lens out of a plurality of objective lenses, with the selected objective lens being shown in a focused position.

The embodiments of the microscope system described so far comprise only a single objective lens 10. However, the invention also relates to microscope systems comprising several exchangeable objective lenses 10. For this purpose, as shown in FIG. 5, several objective lenses 10 are fitted with suitable holding collars 14 and are mounted on a changeover element, such as a rotatable carousel 52 or a linear slider (not shown), which is operable for placing a selected one of the objective lenses 10 into the central optical axis 22 of the microscope. When the changeover element is a carousel 52, the objective lenses 10 are arranged radially around a rotation axis, which is parallel to the central optical axis 22, with the selection being achieved by appropriate rotation of the carousel 52 around the rotation axis. In case of linear slider, the objective lenses are arranged linearly and the selection is achieved by movement of the slider in a plane normal to the central optical axis 22.

The carousel 52 comprises a rotatable support plate 18 having an opening for each objective lens 10. Each opening is provided with a resting ring 16 for pre-centering and guiding the respective objective lens 10, which, together with its holding collar 14, penetrates through the resting ring 16.

Only a single vertical drive mechanism 20 is provided for vertically lifting, i.e., focusing, the selected one of the objective lenses 10. The non-selected objective lenses are suspended within the respective ring 16, with the holding collar 14 resting on the resting ring 16.

In cases without double protection, such as in the embodiment of FIG. 5, all available objective lenses 10 are exposed during the change of the objective lens and afterwards, but only the selected one extends upwards towards the sample when it is in its focused state. Liquid-tight sealing of the interior space is achieved by liquid-tight sliding engagement of each holding collar 16 with the respective resting ring 14, with the support plate 18 serving as protective lid.

Figure 6:
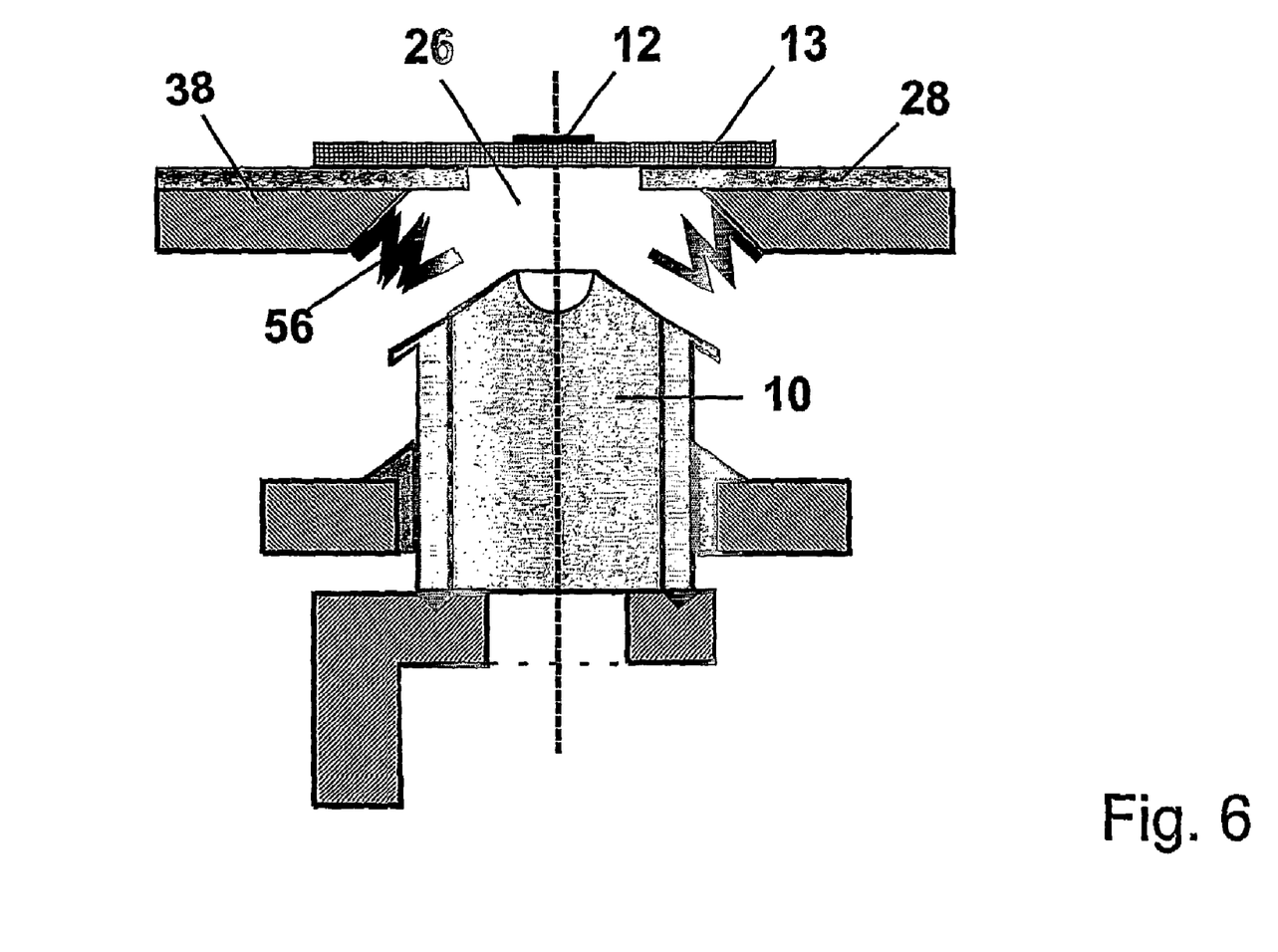
FIG. 6 is a view like FIG. 3, with a modified embodiment being shown.

FIG. 6 shows a modification of the embodiment of FIG. 3, wherein an elastic collar 56, corresponding to the elastic collar 36 of FIG. 3, is not fixed to the removable padding 28 but is rather directly fixed to the body 38. In this case, the padding 28 and the body 38 together act as a protection element for liquid-tight sealing of the exterior space with respect to the interior space of the microscope system. As a further difference, the (lower) end of the collar 56 facing the interior space does not include a clear window but forms a free end which is adapted to engage with the (upper) end of the objective lens 10 facing the specimen 12 in such a manner as to form a liquid-tight seal when the objective lens reaches its final (focused) position (in FIG. 6 an intermediate position of the objective lens 10 prior to reaching the focused position is shown, wherein the elastic collar 56 is not yet in engagement with the objective lens 10). The opening or volume 26 formed by such liquid-tight engagement is preferably filled with an immersion fluid (not shown) pumped into the volume 26 from a reservoir (not shown) located within the body 38 or the padding 28. Suitable passive ways of immersion fluid change are also conceivable.

While the embodiment of FIG. 6 does not provide the gas-tight protection exhibited by previous embodiments, it facilitates the change of objectives with subsequent application of immersion fluid in an automated, high throughput set-up.

Figure 7:
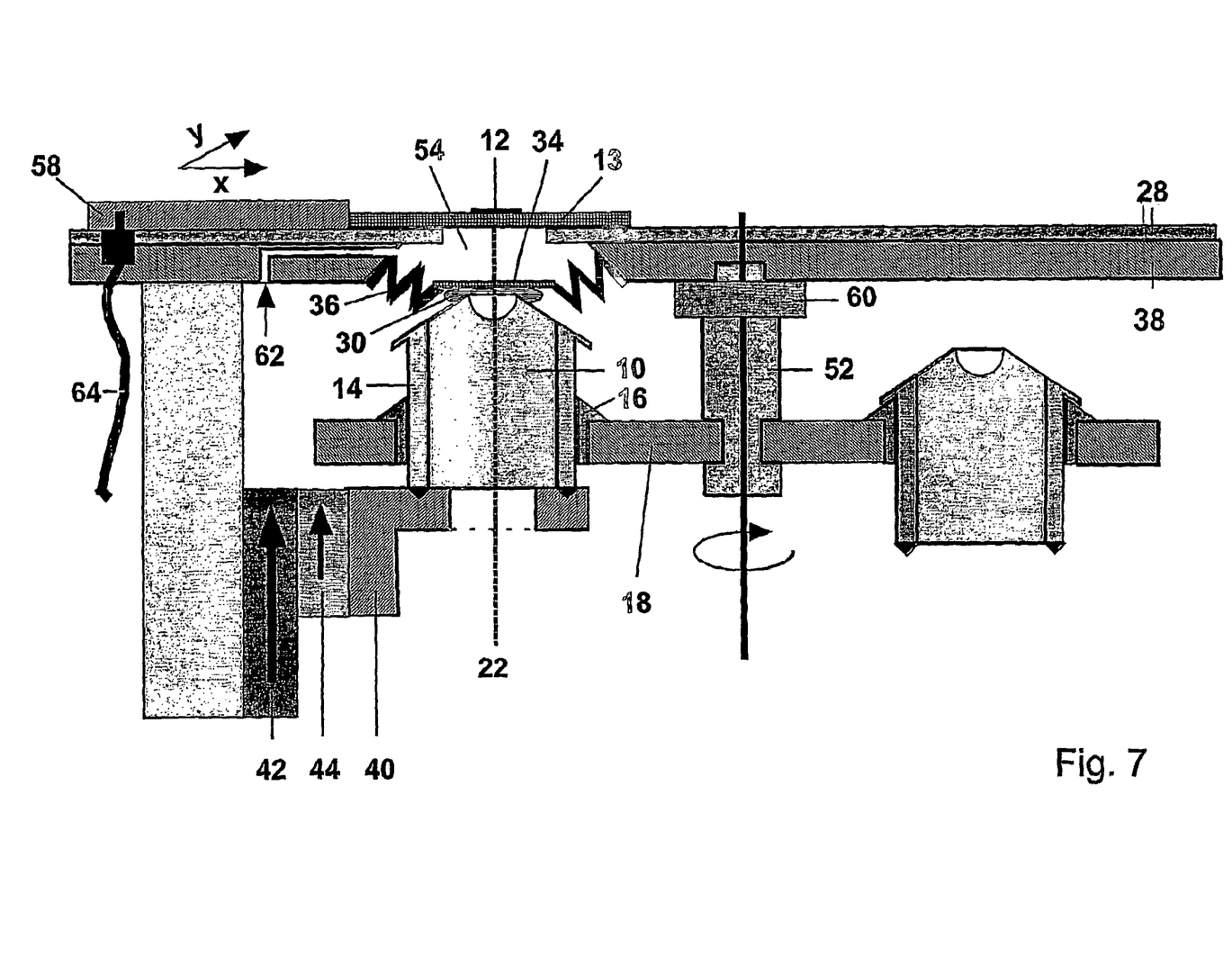
FIG. 7 is a view like FIG. 5 of a modified embodiment with a double protection feature serving as mechanical and electronic backbone having been added.

FIG. 7 shows a modification of the embodiment of FIG. 5, with a double protection feature having been added, which is achieved by a protection element in the form of a plate-like protection lid 28. An opening 54 only is required in the protection lid 28 for the selected objective lens 10. The non-selected objective lenses 10 are not exposed and are directly covered by the protection lid 28. In general, the protection lid 28 may be constructed similar to the protection lid 28 of FIGS. 2a, 2b and 3.

Together with the specimen support 13, the opening 54 may create a sealed volume which can hold an immersion fluid by a clear window 34 which is connected to a body 38 via an elastic collar 36.

In all embodiments, the protection lids 18, 28, not only may provide for strict separation of the interior of the microscope from the environment of the specimen 12 (e.g., an environmental chamber, a clean-bench, etc.), they may also serve as a mechanical "base-plate" for mounting mechanical components above (e.g., an x-y-stage 58, micropipettes, a transmitted light illumination unit) and below (e.g., in FIG. 7, the vertical drive mechanism 40, 42, 44 and a drive 60 for changing the objective lenses). However, in case where the support 18 serves as the protection lid, this holds only for microscopes without objective changer.

The compact design shown in FIG. 7 provides for maximal rigidity and, due to the direct mechanical coupling of all critical components, for maximal vibration protection, since all components will vibrate "in phase". The x-y stage 58 may even become integral part of the protection lid 28. The specimen substrate or support 13 (e.g. a coverslip or a microtiter plate) then slides directly on the top surface of the protection lid 28 or the cover element 38, which for this purpose must have a low friction surface or contain suitable bearings.

In all embodiments, the protection lids 18, 28 may also comprises at least one integrated media supply channel for passing a medium, such as a liquid, between the exterior space and the interior space, or between either the interior space or the exterior space and a media reservoir within the protection lid, or between different reservoirs within the protection lid. In FIG. 7, as an example, an access passage 62 for immersion fluid supply to the sealed volume 54 is shown.

In all embodiments, the protecting lids 18, 28 may also have integrated electronic connectors 64, which connect electronics in the interior of the microscope to devices mounted on top of the microscope. In this way, an electronic backbone is established which is totally sealed and can be kept sterile easily. This is particularly advantageous when the sample itself is to be kept in an environment unfavorable to the interior of the microscope and/or when maximal sterility needs to be maintained as in S-2 or S-3 environments.

The microscope systems shown in the figures are inverted microscopes. However, the present invention is not limited to inverted microscopes, and at least some aspects also apply to upright microscopes. When applying the features shown for inverted microscopes to upright microscopes, the forces in the inverted microscope system provided by gravity have to be generated by appropriate biasing means such as springs. This applies, in particular, to the suspended support of the objective lens(es) which, in an upright microscope, would have to be biased upwardly.

What is claimed is:

1. A microscope system comprising:
   a plurality of exchangeable objective lenses;
   an objective lens changeover element for supporting each of said objective lenses, which is operable for placing a selected one of said objective lenses into an optical axis of said microscope system, wherein each objective lens is supported by the changeover element in such a manner that each objective lens, when selected, is moveable independently from the other of said objective lenses coaxially relative to said optical axis and relative to the changeover element; and
   a single actuator element for moving said selected one of said objective lenses coaxially relative to said optical axis and relative to the changeover element for focusing said selected one of said objective lenses relative to a specimen, said actuator element being common to all of said exchangeable objective lenses and being adapted to engage with said selected one of said objective lenses in a detachable manner.

2. The microscope system according to claim 1, wherein said objective lens changeover element is an objective lens changeover carousel, in which said objective lenses are arranged radially around a rotation axis, which is parallel to said optical axis, the changeover carousel being rotatable around said rotation axis for placing said selected one of said objective lenses into said optical axis.

3. The microscope system according to claim 1, wherein said objective lens changeover element is a linear slider in which said objective lenses are arranged linearly and which is moveable in a plane normal to said optical axis for placing said selected one of said objective lenses into said optical axis.

4. The microscope system according to claim 1, wherein said actuator element comprises centering means for centering the selected one of said objective lenses relative to said actuator element.

5. The microscope system according to claim 1, wherein said objective lens changeover element forms an outer surface having a plurality of openings, each of said objective lenses penetrating through one of said openings.

6. The microscope system according to claim 5, wherein each of said objective lenses is suspended within the respective one of said openings.

7. The microscope system according to claim 6, wherein each of said objective lenses is provided with a holding collar for holding the respective objective lens within the respective opening.

8. The microscope system according to claim 5, wherein each of said openings is provided with a centering means for pre-centering the respective objective lens within said opening.

9. The microscope system according to claim 8, wherein said centering means is a ring.

10. The microscope system according to claim 9, wherein said ring is adapted to support the respective objective lens when it is not engaged with said actuator element.

11. The microscope system according to claim 1, further comprising sealing means for sealing each of said openings of the changeover element in order to prevent liquid from passing through said opening.

12. The microscope system according to claim 11, wherein said sealing means comprise a holding collar tightly fitting around the respective objective lens and a ring, which is fixed within the respective opening to said support element and which is in sliding engagement with said holding collar.

13. The microscope system according to claim 11, wherein the changeover element is adapted for liquid-tight sealing of an interior space of said microscope system relative to an exterior space outside of said microscope system.

14. The microscope system according to claim 1, further comprising an interior space within which said objective lenses are located, a transparent substrate for supporting said specimen on a side of the substrate facing an exterior space, and a protection element for liquid-tight sealing of said interior space relative to said exterior space, said protection element comprising an opening which is covered by said substrate at an end of the opening facing said exterior space and which is provided with an liquid-tight, transparent seal at that end of said opening facing said interior space.

15. The microscope system according to claim 1, wherein said microscope system is an inverted microscope, said actuator element being adapted to support said selected one of said objective lenses at the lower end thereof and being provided with a hole for enabling penetration of light through said actuator element to and from said selected one of said objective lenses.

16. A microscope system comprising an interior space;
a plurality of objective lenses located within said interior space;
an objective lens changeover element for supporting each of said objective lenses which is operable for placing a selected one of said objective lenses on said optical axis of said microscope system,
a single actuator element for moving said objective lens coaxially relative to said optical axis for focusing said objective lens relative to a specimen;
a transparent substrate for supporting said specimen on a side of the substrate facing an exterior space; and
a protection element for liquid-tight sealing of said interior space relative to said exterior space, said protection element comprising an opening which is covered by said substrate at an end of the opening that faces said exterior space and which is provided with a liquid-tight, transparent seal at an end of said opening that faces said interior space;
wherein each objective lens is supported by the changeover element in such a manner that each objective lens is moveable coaxially relative to said optical axis and relative to the changeover element; said changeover element being adapted to guide each of said objective lenses coaxially relative to said optical axis; said actuator element being adapted for moving said selected one of said objective lenses coaxially relative to said optical axis and relative to the changeover element for focusing said selected one of said objective lenses relative to said specimen; said actuator element being common to all of said exchangeable objective lenses and being adapted to engage with said selected one of said objective lenses in a detachable manner.

17. The microscope system according to claim 16, further comprising a body in said interior space for supporting said protection element, said body having an aperture aligned with said opening, and said protection element being removeable from said body.

18. The microscope system according to claim 17, wherein the seal of said protection element comprises an elastic collar surrounding said opening and projecting into said interior space, said elastic collar comprising a clear window adapted to engage with said objective lens, and said elastic collar being compressible upon movement of said objective lens along said optical axis.

19. The microscope system according to claim 17, wherein said protection element comprises a disposable padding.

20. The microscope system according to claim 16, further comprising a support element for supporting said objective lens in an optical axis of said microscope system in such a manner that said objective lens is moveable coaxially to said optical axis and relative to said support element; said actuator element being adapted to move said objective lens relative to said support element.

21. The microscope system according to claim 16, wherein said protection element is adapted as a mechanical support for at least one mechanical component of said microscope system.

22. The microscope system according to claim 21, wherein said mechanical component is at least one element selected of the group consisting of an x-y stage, a micropipette, a transmitted light illumination unit and said actuator element.

23. The microscope system according to claim 16, wherein said protection element comprises at least one electronic connector integrated within said protection element for connecting an electronic component located in said interior space with an electronic component located in said exterior space.

24. The microscope system according to claim 16, wherein said protection element comprises at least one integrated media supply channel for passing a fluid medium between said exterior space and said interior space or between one of said interior space and said exterior space and a media reservoir within said protection element.

25. The microscope system according to claim 24, wherein said media reservoir is formed by said opening and wherein the supply channel serves to provide immersion fluid to said opening.

26. The microscope system according to claim 16, wherein said opening is adapted to form a liquid-tight space.

27. The microscope system according to claim 26, wherein said opening is adapted to receive an immersion fluid.

28. The microscope system according to claim 16, wherein said protection element comprises a reservoir for supplying said opening with immersion fluid.

29. The microscope system according to claim 16, wherein an elastic diaphragm is provided for liquid-tight sealing of said end of said opening opposed to the end covered by said substrate.

30. The microscope system according to claim 16, further comprising an elastic collar which surrounds said opening and which is fixed to said protection element, said elastic collar comprising a clear window adapted to engage with said objective lens, and said elastic collar being compressible upon movement of said objective lens along said optical axis.

31. The microscope system according to claim 16, further comprising an elastic collar which surrounds said opening and which is fixed to said protection element at one end, wherein said liquid-tight, transparent seal at that end of said opening facing said interior space is formed by engagement of a free end of said collar with a side of said objective lens facing said specimen, when said objective lens is in a focused position.

32. The microscope system according to claim 16, wherein said protection element is also adapted for gas-tight sealing of said interior space relative to said exterior space, said liquid-tight, transparent sealing at that end of said opening facing said interior space also being gas-tight.

33. The microscope system according to claim 16, wherein said opening is adapted to receive an end of said objective lens facing the specimen.

34. The microscope system according to claim 16, wherein said actuator element comprises a support arm driven by a coarse drive and a fine drive connected in series, said support arm being adapted to engage with said objective lens.

35. The microscope system according to claim 34, wherein said coarse drive is of a motor-driven spindle type and wherein said fine drive is a piezo drive.

36. The microscope system according to claim 16, wherein said actuator element comprises a support arm driven by a combo drive, said support arm being adapted to engage with said objective lens.

37. The microscope system according to claim 36, wherein said combo drive comprises piezo motor means.

* * * * *